(12) United States Patent
Marbach et al.

(10) Patent No.: US 6,711,698 B1
(45) Date of Patent: Mar. 23, 2004

(54) PROGRAMMABLE LOGIC CONTROLLER WITH PROVISIONS FOR SAFETY SYSTEMS

(75) Inventors: Alain Marbach, Belmont, MA (US); Andre Peyrache, Saint-Ismier (FR); Richard A. Baker, West Newbury, MA (US); Dennis J. W. Dube, Pelham, NH (US)

(73) Assignee: Schneider Automation Inc., North Andover, MA (US)

( * ) Notice: Subject to any disclaimer, the term of this patent is extended or adjusted under 35 U.S.C. 154(b) by 484 days.

(21) Appl. No.: 09/611,648

(22) Filed: Jul. 7, 2000

(51) Int. Cl.[7] .................................................. G06F 11/00

(52) U.S. Cl. ................................ 714/4; 714/43; 700/79

(58) Field of Search ................................ 714/5, 13, 43, 714/44, 4, 57; 700/21, 79, 80, 81, 82, 83

(56) References Cited

U.S. PATENT DOCUMENTS

| 4,958,270 | A | * | 9/1990 | McLaughlin et al. .......... 700/82 |
| 5,119,318 | A | * | 6/1992 | Paradies et al. ............... 706/52 |
| 5,131,092 | A | * | 7/1992 | Sackmann et al. ........... 709/207 |
| 5,163,151 | A | * | 11/1992 | Bronikowski et al. ......... 714/57 |
| 5,251,302 | A | * | 10/1993 | Weigl et al. ................. 710/263 |
| 5,721,722 | A | * | 2/1998 | Kato et al. ...................... 700/2 |
| 5,966,304 | A | * | 10/1999 | Cook et al. .................... 700/82 |
| 6,141,628 | A | * | 10/2000 | Worth et al. ................. 702/185 |
| 6,169,928 | B1 | * | 1/2001 | Olson et al. .................... 700/7 |

* cited by examiner

*Primary Examiner*—Scott Baderman
(74) *Attorney, Agent, or Firm*—Larry I. Golden

(57) ABSTRACT

A controller and a method for operating the controller is disclosed. The controller, in response to a detected Ethernet network error, performs the steps of determining whether a communication error has occurred, notifying the controller that an error has occurred, stopping normal controller operation, and executing fail safe routine.

24 Claims, 3 Drawing Sheets

PROGRAMMABLE LOGIC CONTROLLER WITH PROVISIONS FOR SAFETY SYSTEMS

TECHNICAL FIELD

The present invention relates to the use of controllers, such as programmable logic controllers on Ethernet networks with provisions for safety systems.

BACKGROUND OF THE INVENTION

In a factory automation system, such as those in a nuclear power plant, manufacturing or petrochemical plant, the assurance of delivery of a message is critical to safe operation. As Ethernet protocols, which were originally developed for office automation markets, are moved into critical factory applications, new techniques need to be developed to assure the safety of the communication and control systems. Since network communications can never be fully guaranteed, provisions must be implemented to detect network errors and notify the corresponding programmable logical controller working in a factory environment so that it may take appropriate action when a failure occurs.

SUMMARY OF THE INVENTION

It is an object of the invention to provide a controller with provisions for a safety system.

In accordance with this object, a system and method are disclosed whereby the system determines whether an Ethernet communication error has occurred, and if an error has occurred notifies the controller that an error has occurred, stops normal controller operation; and executes fail-safe software code to take appropriate action.

In a second aspect of the present invention, a system and method are disclosed whereby a first and second controller in response to a detected Ethernet network error determines whether a communication error has occurred, notifies the first controller that an error has occurred, sends a network message to the second controller to start the second controller, and operates the second programmable controller on the network in place of the first controller.

DETAILED DESCRIPTION

Figure 1:
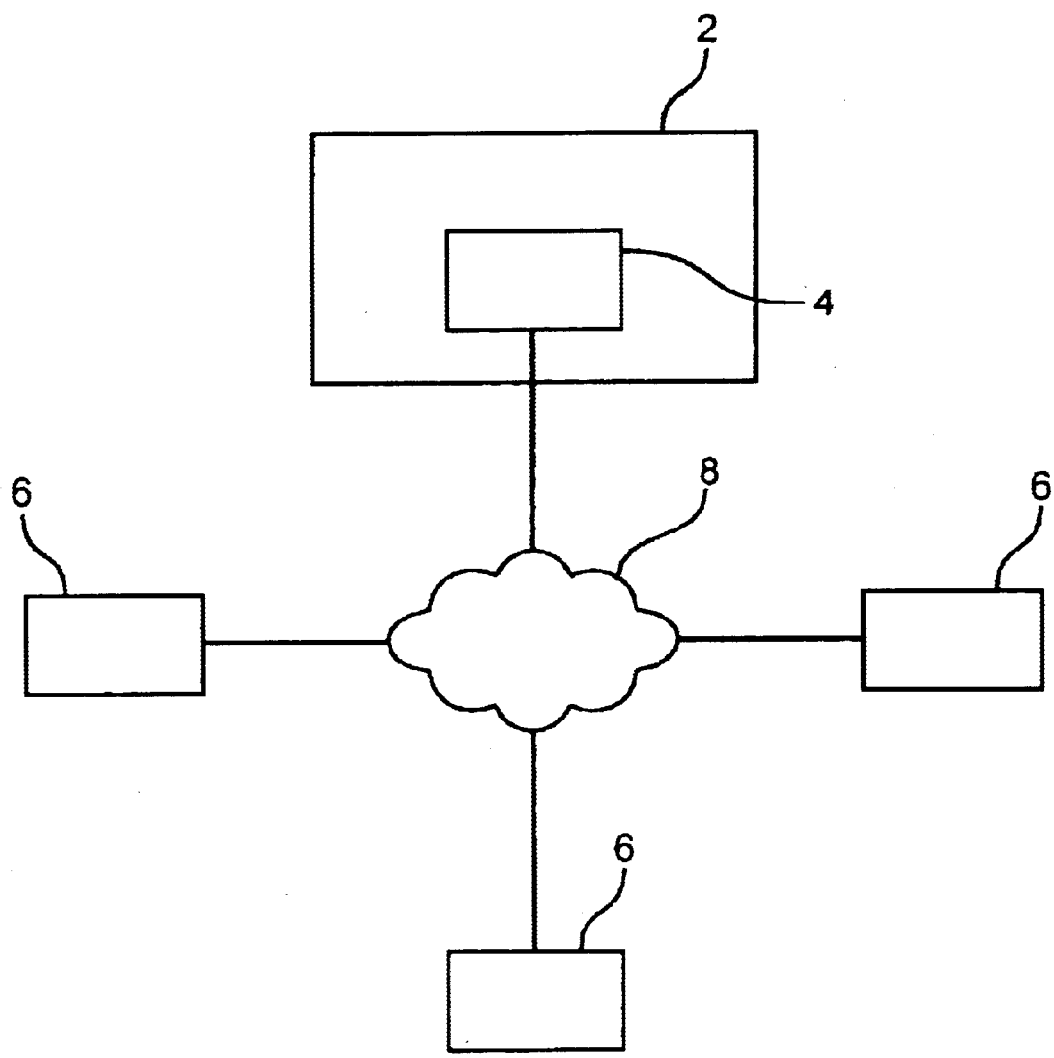
FIG. 1 is a diagram of the system according to the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a controller (PLC) 2 having an Ethernet communication board 4. The Ethernet communication board 4 is capable of sending and receiving network messages to and from any other device 6 on an Ethernet network 8, such as a transceiver, a personal computer, a data relay, other another PLC etc. The basic Ethernet communication board 4 used in the PLC is described in U.S. patent application Ser. Nos. 08/927,005, 09/224,196, 09/303,458 and 09/477,113 the contents of such applications are hereby incorporated by reference.

Figure 2:
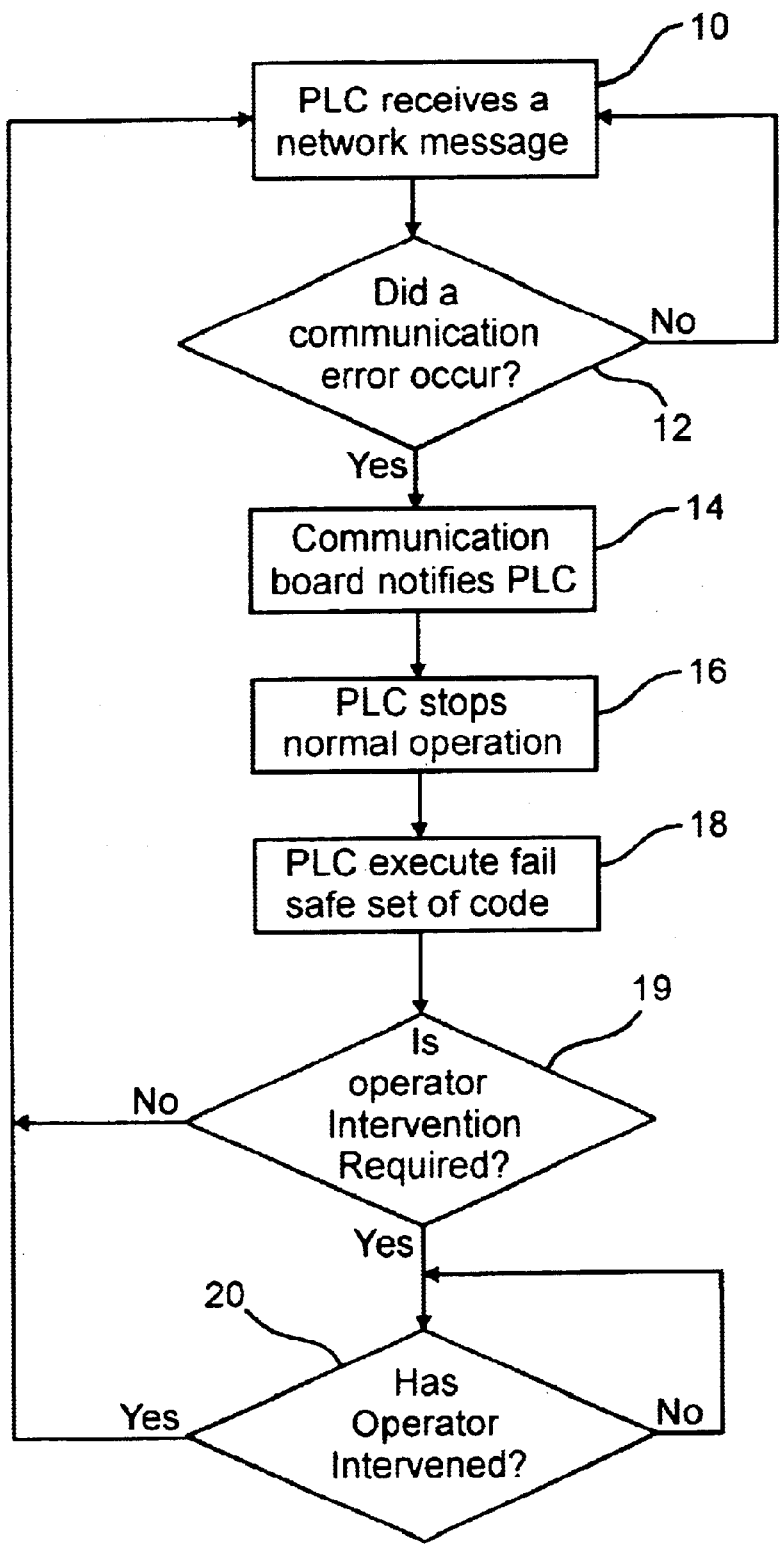
FIG. 2 is a flow chart of the system according to a first embodiment of the present invention.

Referring to FIG. 2, in step 10 the Ethernet communication board 4 of the PLC 2 receives a network message. Network messages are transmitted between the PLC 2 and the other network devices 6. At step 12, the Ethernet communication board 4 determines whether a network communication error has occurred. The PLC 2 determines if there is a network communication error primarily by performing a CRC-32 check on the network message to determine is the message has been corrupted in transit by checking the logical data included in the network message header. If no network communication error has occurred in step 12, the PLC 2 returns to step 10 to process the next network message. If a network error has occurred, the PLC 2 advances to step 14. At step 14, the Ethernet communication board 4 notifies the PLC 2 that a network communication error has occurred. At step 16, in response to the notification the PLC 2 stops normal operation and advances to step 18. Normal operation is the operation of the PLC during which no network error has been detected. At step 18, the PLC executes a fail-safe set of code and advances to step 19. By way of example, the fail-safe set of code can be code which activates an alarm to notify personnel.

At step 19, the PLC fail-safe code determines if operator intervention is required. If operator intervention is required, the PLC advances to step 20. Otherwise, the PLC advances to step 10 to resume normal Ethernet network communication.

If operator intervention is required, at step 20, the PLC determines whether an operator has intervened. Operator intervention can be, for example, an operation clearing or acknowledging the alarm. If an operator has not intervened, the PLC 2 does not advance beyond step 20. If an operator has intervened, the PLC 2 advances to step 10 to continue normal Ethernet network communication.

Figure 3:
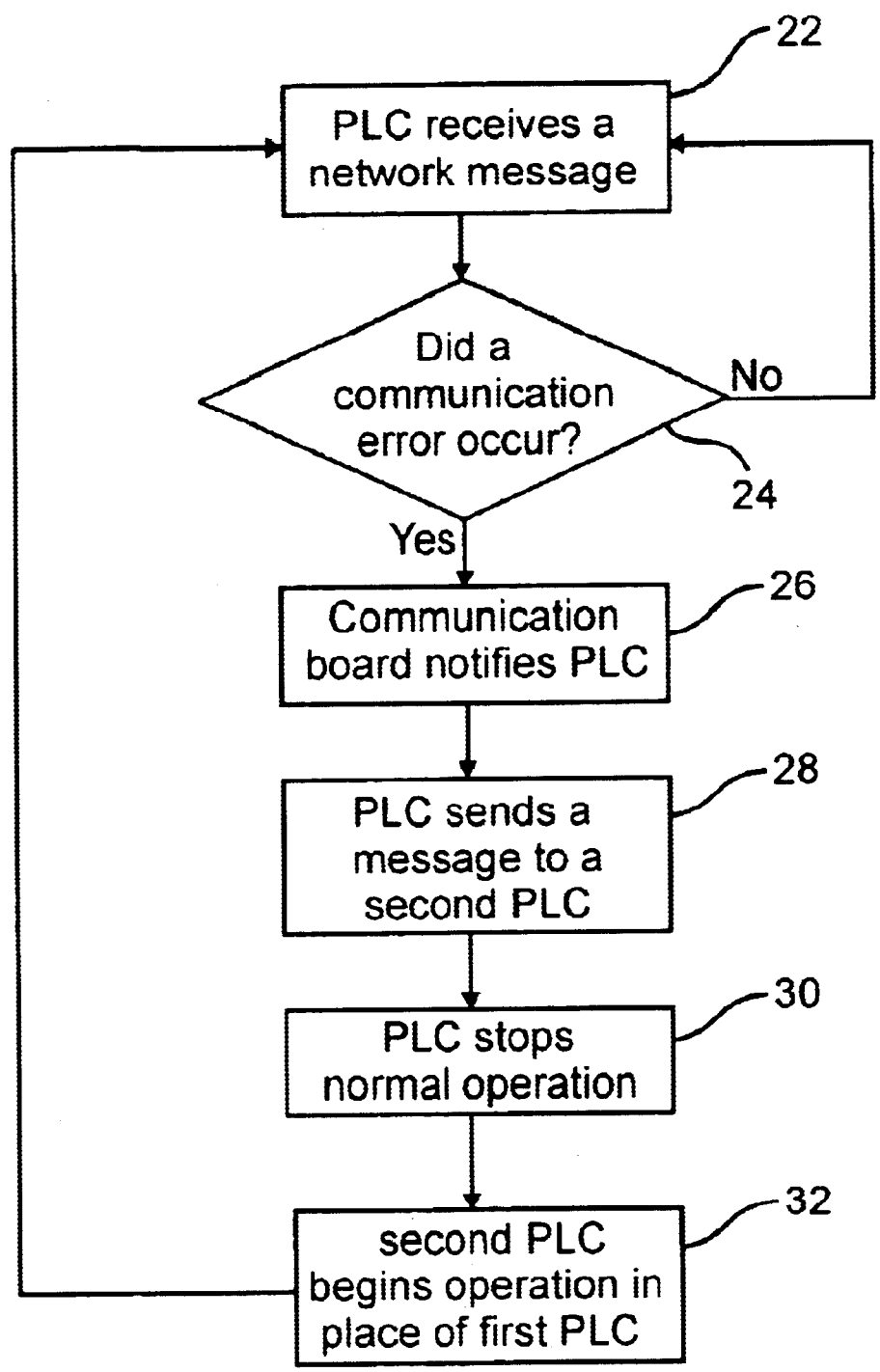
FIG. 3 is a flow chart of the system according to a second embodiment of the present invention.

Referring to FIG. 3, in an alternative embodiment, the Ethernet communication board 4 of the PLC 2 receives a network message at step 22. At step 24, the Ethernet communication board 4 determines whether a network communication error has occurred. If no network error has occurred in step 24, the PLC 2 returns to step 22 to process the next network message. If a network error has occurred, the PLC 2 advances to step 26. At step 26, the Ethernet communication board 4 notifies the PLC.2 that a network communication error has occurred and advances to step 28. After step 28, in response to the notification the PLC 2 sends a message to a second PLC 6 operating on the network, and then the PLC 2 ceases sending and receiving messages on the network in step 30. In response to the message of step 28, the second PLC 6 begins operating on the network in place of the first PLC in step 32. The second PLC 6 mirrors the first PLC 2 and, therefore, can resume operation for the first PLC 2 without interruption to the process controlled by the first PLC 2. The second PLC 6 then begins sending and receiving network messages in place of the first PLC 2.

While the specific embodiments have been illustrated and described, numerous modifications come to mind without significantly departing from the spirit of the invention and the scope of protection is only limited by the scope of the accompanying claims.

We claim:

1. A method of controlling a controller in response to a detected Ethernet network error comprising the steps of:

determining whether a network error has occurred;

notifying the controller that a network error has occurred;

stopping normal controller operation; and applying a fail safe mode.

2. The method of claim 1 wherein the step of applying the fail safe mode comprises executing a fail safe software routine.

3. The method of claim 2 further comprising the steps of:
determining whether an operator has intervened; and
returning to normal PLC operation after an operator has intervened.

4. The method of claim 1, wherein the step of determining whether a network error has occurred comprises performing a CRC-32, check on the network message to determine if the network message has been corrupted.

5. A method of controlling a first and second controller in response to a detected Ethernet network error comprising the steps of:
determining whether a network communication error has occurred;
notifying the first controller that a network communication error has occurred;
sending a network message to the second controller to start the second controller; and
operating the second controller on the network in place of the first controller.

6. The method of claim 5, wherein the step of determining whether a network communication error has occurred comprises performing a CRC-32, check on the network message to determine if the network message has been corrupted.

7. A controller comprising:
means for determining whether an Ethernet network error has occurred;
means for notifying the controller that a network error has occurred;
means for stopping normal controller operation; and
means for executing a fail safe routine.

8. The controller of claim 7 further comprising:
means for determining whether an operator has intervened; and
means for returning to normal controller communication after an operator has intervened.

9. The controller of claim 7, wherein the means for determining whether an Ethernet network error has occurred comprises means for performing a CRC-32, check on the network message to determine if the network message has been corrupted.

10. An Ethernet communication network having a first controller and a second controller comprising:
means for determining whether a network communication error has occurred;
means for notifying the first controller that a network communication error has occurred;
means for sending a network message to the second controller to start the second controller; and
means for operating the second controller on the network in place of the first controller.

11. The Ethernet communication network of claim 10, wherein the means for determining whether a network communication error has occurred comprises means for performing a CRC-32, check on the network message to determine if the network message has been corrupted.

12. A method for determining whether a network communication error has occurred comprising the steps of:
providing a first PLC connected to a plurality of devices by a network;
providing a first communication board operatively associated with the first PLC;
receiving a first network message by the first communication board;
determining whether a network communication error has occurred by performing a check on the first network message by the communication board; and,
notifying the first PLC if the first network message is corrupted.

13. The method of claim 12, further comprising the step of:
stopping the normal operations of the first PLC if there is a network communication error.

14. The method of claim 13, further comprising the step of:
executing fail-safe code by the first PLC.

15. The method of claim 14, wherein executing fail-safe code by the first PLC comprises the step of:
activating an alarm to notify personnel of the network communication error.

16. The method of claim 15, further comprising the step of:
determining if an operator has intervened in response to the alarm being activated.

17. The method of claim 12, further comprising the steps of:
sending a second network message to a second PLC connected to the network from the first PLC; and,
operating the second PLC in place of the first PLC.

18. The method of claim 17, further comprising the step of:
sending and receiving network messages by the second PLC in place of the first PLC.

19. The method of claim 12, wherein the step of determining whether a network communication error has occurred by performing a check on the first network message by the communication board comprises performing a CRC-32 check on the first network message.

20. A plurality of devices connected by a network connection comprising:
a plurality of devices connected by a network connection, the plurality of devices including a first PLC; and,
a communication board for use with the first PLC, the communication board configured to receive a first network message over the network connection and determined whether a network communication error occurred, the communication board further configured to notify the first PLC if a network communication occurred.

21. The plurality of devices of claim 20, wherein the communication board is configured to determine if the first network message is corrupted.

22. The plurality of devices of claim 21, wherein the communication board is configured to perform a CRC-32, check on the first network message.

23. The plurality of devices of claim 20, wherein the first PLC is configured to stop normal operation if the communication board notifies the first PLC that a network communication error occurred.

24. The plurality of devices of claim 23, further comprising a second PLC configured to operate in place of the first PLC upon receipt of a message from the first PLC.

* * * * *